May 8, 1934.  F. H. McCANN  1,957,608
ADJUSTABLE HEADREST
Filed Jan. 19, 1934  2 Sheets-Sheet 2
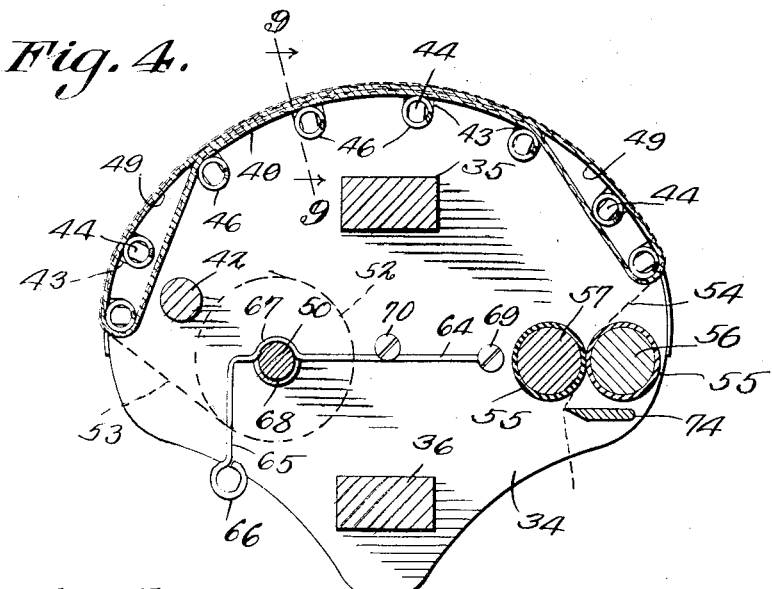
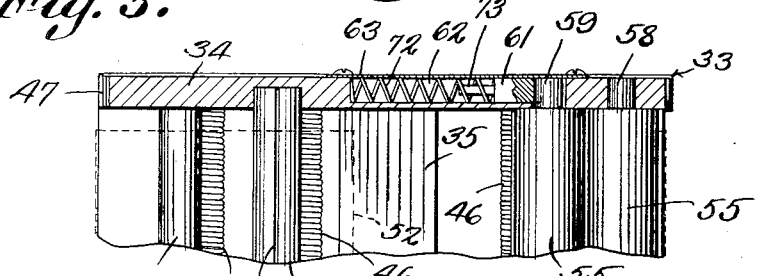
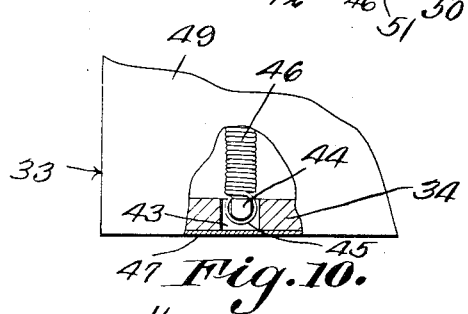
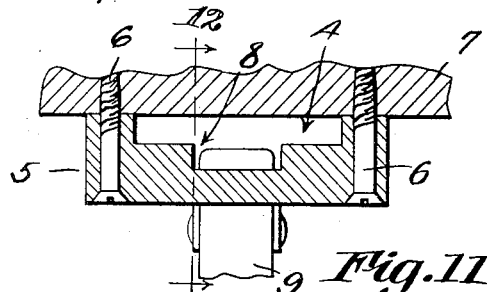
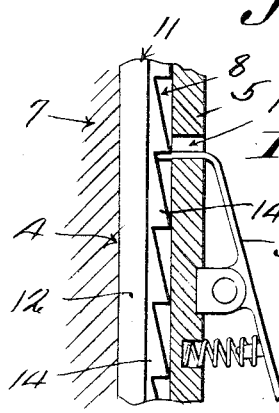
F. H. McCann
Inventor Patented May 8, 1934

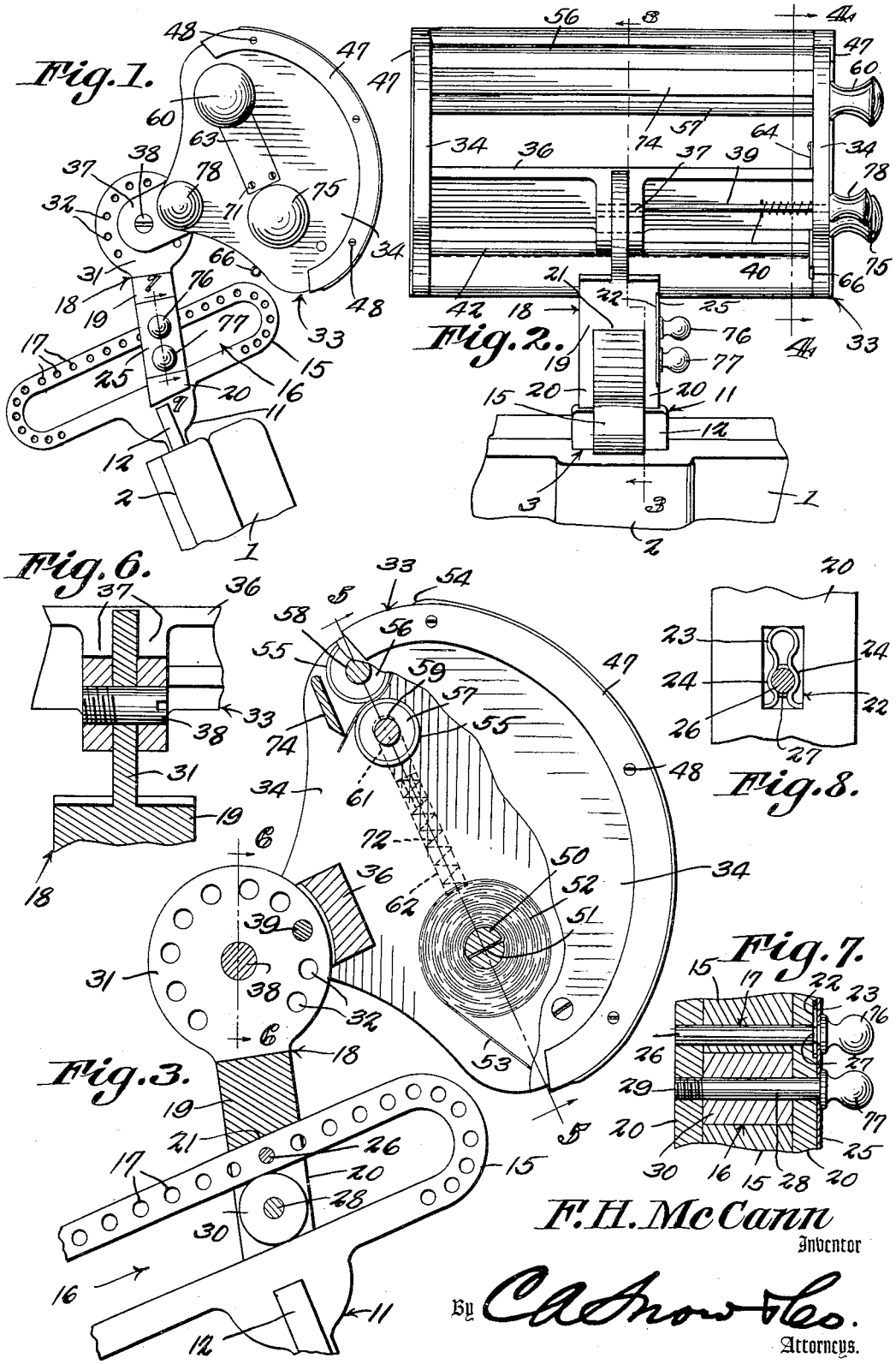

1,957,608

UNITED STATES PATENT OFFICE 1,957,608

ADJUSTABLE HEADREST

Frank H. McCann, Canton, S. Dak.

Application January 19, 1934, Serial No. 707,375

3 Claims. (Cl. 155—177)

The device forming the subject matter of this application is a head rest, adapted to be used on barber chairs, surgeon chairs, dentist chairs, in beauty parlors, and in many other places, which will suggest themselves readily to the user.

One object of the invention is so to mount the head rest that it has a novel compound movement, consisting of three parts, hereinafter more fully described. Another object of the invention is to improve the construction of the head rest and make it more comfortable to the patient or customer. A further object of the invention is to improve the paper-carrying and cutting mechanism of the head rest.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in end elevation, a device constructed in accordance with the invention, mounted on a chair;

Fig. 2 is a rear elevation of the structure shown in Fig. 1;

Fig. 3 is a vertical transverse section taken approximately on the line 3—3 of Fig. 2;

Fig. 4 is a vertical transverse section taken approximately on the line 4—4 of Fig. 2;

Fig. 5 is a section taken approximately on the line 5—5 of Fig. 3;

Fig. 6 is a section taken approximately on the line 6—6 of Fig. 3;

Fig. 7 is a section taken approximately on the line 7—7 of Fig. 1;

Fig. 8 is a fragmental elevation showing a portion of one of the forks;

Fig. 9 is a section taken approximately on the line 9—9 of Fig. 4;

Fig. 10 is a plan of the structure shown in Fig. 9;

Fig. 11 is a sectional detail showing a modification;

Fig. 12 is a section on the line 12—12 of Fig. 11.

In Figs. 1 and 2, the numeral 1 marks a chair back, provided with a rearwardly extended offset 2, affording a guide way 3, shown in Fig. 2. In this form of the invention, the guide way 3 is formed integrally with the chair back 1, but, referring to Fig. 11, it may be noted that a corresponding guide way 4 may be formed in a separate strip 5, attached by securing elements 6 to the chair back 7. The structure shown in Figs. 11 and 12 adapts the invention to chairs which do not already have the guide way 3 of Fig. 2. It appears in Fig. 11 that the guide way 4 has a reduced portion 8, and the guide way 3 of Fig. 1 is similarly constructed. A spring-actuated latch 9, of any desired construction, is mounted on the strip 5, as shown in Fig. 12, and one end of this latch works through an opening 10 in the strip 5. The offset 2 of Fig. 2 may be supplied with a like latch, Fig. 12 although showing a modification, being sufficient to illustrate this detail.

Broadly speaking, the structure resolves itself into three major parts, and these parts are a head rest support, a head rest carrier, and a head rest. They will be described in the order specified. The head rest support is denoted generally by the numeral 11.

The head rest support 11 comprises a standard 12 having a rack 14, as shown in Fig. 12. The standard 12 slides in the guide way 3 of Fig. 2, or in the guide way 4 of Fig. 11, and the rack 14 is received slidably in the offset portion 8 of the guide way, illustrated in Fig. 11. The latch 9 cooperates with the rack 14, to hold the standard 12 in any position to which it may have been adjusted vertically. The head rest support 11 comprises a loop-shaped head 15, rigidly mounted on the upper end of the standard 12 and extended backwardly and forwardly with respect to the chair. The loop-shaped head 15, as Fig. 1 will show, has an elongated central opening 16, with parallel upper and lower edges. In the upper bar of the head 15 there are perforations 17 which are extended downwardly along the end members of the head 15, and upon the lower bar of the head.

The head rest carrier is marked generally by the numeral 18. It comprises a shank 19, provided at its lower end with arms 20, which form a fork. In this fork, the head 15 of the support 11 is received, as shown in Fig. 3. The shank 19 of the head rest carrier 18 has no movement transversely of the head 15, but the shank can be adjusted longitudinally of the head 15. The lower end surface of the shank 19, that is the upper end surface of the fork formed by the arms 20, is designated by the numeral 21, and slides along the upper surface of the upper bar of the head 15 of the head rest support 11. The end surface 21 is so inclined that the shank 19 of the head rest carrier 18 does not make a right angle with the upper bar of the head 15 of the head rest support, but has a slight forward inclination with respect thereto, as Figs. 3 and 1 will show. In the outer surface of one of the arms 20 of the fork there is a shallow recess 22, which is shown in Figs. 8 and 7. In the recess 22 is placed a U-shaped retainer 23, the arms of which have oppositely convexed parts 24. The retainer 23 is kept in the recess 22 by a cover plate 25 secured to the outer surface of the arm 20 of the fork which has the recess 22. An anchoring device 26 is supplied, and is in the form of a removable pin having an external head. The pin or anchoring device 26 extends through the cover plate 25, and through the arms 20 of the fork, and may be mounted in any of the openings 17 that are fashioned in the head 15 of the head rest support 11. The anchoring device or pin 26 is supplied with a circumferential seat 27, in which the oppositely convexed parts 24 of the retainer 23 fit, the member 26 thus being kept in place, but removable at the will of an operator. A shaft pin 28 extends through the cover plate 25 and through the arms 20 of the fork of the head rest carrier 18, and is threaded at 29 (Fig. 7) into one of the arms, the pin 28 having an external head 77. On the shaft pin 28, a roller 30 is journaled for rotation. The roller 30 fills the space between the arms 20 of the fork (Fig. 7) and it fills the space between the upper and lower bars of the head 15 of the head rest support 11, as Fig. 3 will show. Owing to the presence of the roller 30, and the end surface 21 of the shank 19, the shank 19 has a considerable amount of adjustment, lengthwise of the head 15 of the head rest support, the shank 19 remaining at a fixed, forwardly-inclined angle, with respect to the head 15.

It is possible, however, to move the shank 19 of the head rest carrier 18 to either end of the head 15 of the head rest support 11, the anchoring pin 26 being placed in the corresponding openings at the ends of the head 15. Then the shank 19 of the head rest carrier 18 no longer has an adjustment at a fixed angle with respect to the upper edge of the head 15, but is capable of a pivotal adjustment around either end of the head 15. The shank 19 of the head rest carrier has a disk-like top 31, in which there are a plurality of openings 32, arranged in a circle.

Passing to the description of the head rest itself, it may be remarked that the head rest is designated generally by the numeral 33. The head rest 33 is made up of two parallel end members 34, which taper at their lower ends, as shown in Fig. 4. The end members 34 of the head rest 33 are connected by a rigid upper tie 35 and by a rigid lower tie 36. The lower tie 36 has rearwardly projecting arms 37, located on opposite sides of the top member 31 of the head rest carrier 18. A shaft 38, such as a screw (shown in Fig. 6) is mounted in the arms 37 and is pivoted in the center of the disk-like top 31 of the head rest carrier 18, the construction being such that the head rest 33 may be adjusted, by a swinging movement, forwardly and backwardly. This swinging movement may be varied by engaging in any of the openings 32 of the disk 31, a latch pin 39 which is slidable in the arms 37 and in one of the end members 34 of the head rest 33, as Fig. 2 will disclose. The latch pin 39 has an external head 78. There is an abutment 40 (Fig. 2) on the latch pin 39, and a compression spring 41 is interposed between the abutment 40 and the adjacent end member 34 of the head rest 33, the tendency of the spring being to keep the latch pin 39 engaged in the openings 32 of the head 31 of the head rest carrier 18. The spring 41 surrounds a portion of the latch pin 39. The end members 34 of the head rest 33 are additionally connected together by a rod 42, shown in Figs. 4 and 5, and located near to the rear edge of the end members 34 of the head rest.

In its edge, each end member 34 of the head rest 33 has openings or notches 43, disclosed in Figs. 4, 10 and 9. The end members 34 have projections 44, disposed in the openings 43. On the projections 44 are detachably engaged the terminal eyes 45 of flexible resilient members 46, which may be pull springs. The openings 43 are closed at their outer sides, and at the upper edges of the end members 34 of the head rest 33 by angle members 47 (Fig. 9), extended downwardly over the openings, and inwardly across the mouths of the openings. The angle members 47, as shown in Fig. 1, are curved to correspond with the outer edge contour of the end members 34 of the head rest 33, and the angle members are held in place by securing elements 48, such as screws, passing through the vertical flanges of the angle members 47 and entering the end members 34 of the head rest. A flexible, loop-shaped cover 49, shown in Fig. 4, is engaged about the terminal springs 46. The lower run of the cover passes underneath those springs 46 which are immediately adjacent to the terminal springs in Fig. 4, but the lower run of the cover passes above and in contact with most of the intermediate springs of the series.

The upper run of the cover 49 passes over the upper or outer portions of all of the springs 46. It can be seen in Fig. 9 that the lower run of the loop-shaped flexible cover 49 lies between the end members 34 of the head rest, whereas the upper run of the cover overlaps the horizontal, inwardly projecting flanges of the angle members 47. The head of the patient or customer therefore rests entirely on the cover 49, which, being made of oil cloth or some similar substance, may be kept readily clean and sanitary.

A means is supplied for overlaying the cover 49 of the head rest with a roll of paper, the end of which may be severed upon occasion. With this end in view, a roll-carrying shaft 50 is journaled in the end members 34 of the head rest 33 and has a knob 75 accessible from without the head rest. The shaft 50 has a longitudinal slot 51 extended diametrically therethrough, and in this slot may be placed one end of the roll 52 of paper which the shaft 50 carries. In order to prevent the roll shaft 50 from turning too freely and paying slack off the roll 52 of paper, there is provided a brake, which is shown in Fig. 4. This brake may be in the form of a resilient rod 64 having a down-turned rectangular end 65, terminating in a finger piece 66 located accessibly below one of the end members 34 of the head rest 33. The brake rod 64 has a curved seat 67 engaged in a circumferential groove 68 in the roll shaft 50 and holding the roll shaft in place, as well as having a braking effect on said shaft. One end of the rod 64 is attached by a securing member 69, such as a screw, to one of the end plates 34, and the seat 67 is held down in the groove 68 of the roll shaft 50 by a securing element 70, such as a screw, threaded into one of the end members 34 and engaged above the brake rod 64.

The paper from the roll 52 extends outwardly, as shown at 53 in Fig. 4, and passes over the top of the cover 49 at one transverse edge of the cover. The end of the strip of paper passes inwardly, at the opposite transverse edge of the cover, as shown at 54 in Fig. 4, between the end members 34 of the head rest 33, and is engaged between the resilient coverings 55 of a pair of feed rollers 56 and 57. The roller 57 is journaled at 58 in the end members 34 of the head rest, and receives no direct rotation at the hand of an operator. The trunnions 59 of the feed roller 56 are similarly journaled, but one of these trunnions has an external knob 60 (Fig. 1), by which the roller 57 can be rotated by an operator.

A means is provided whereby the feed roller 57 can be moved transversely and pressed resiliently toward the feed roller 56, in order to grip the part 54 of the paper firmly. With this end in view, the trunnions 59 of the roller 57 are engaged by bearings 61, slidable in recesses 62 in the outer surfaces of the end members 34 of the head rest 33, the recesses 62 being closed at their outer side by cover plates 63 (Fig. 1) secured at 71 to the end members 34. In the recesses 62 are disposed pressure springs 72, engaged at their inner ends with the end members 34 ( Fig. 5) and engaged at their outer ends with the bearings 61, the said bearings having projecting pins 73, engaged within the springs.

From the feed rollers 56 and 57, the part 54 of the paper extends downwardly across the sharpened edge of a shear blade 74, carried by and extended between the end members 34 of the head rest 33.

The operation of the paper feed will be understood readily from Figs. 4 and 1. The operator turns the feed roll 56 by means of the knob 60, the cooperating feed rolls 56 and 57 pull forward a clean section of paper over the cover 49, from the roll 52, and the soiled piece of paper, depending below the shear blade 74, is torn off across the sharpened edge of the shear blade. If a free run of paper is desired, for instance when a clean section of paper is being advanced, this may be done by slacking off the brake rod 64 of Fig. 4, the brake rod simply being sprung upwardly, clear of the roll shaft 50, through the instrumentality of the finger piece 66.

Head rests of the kind under discussion are known to have two adjustments, one of which consists in tipping the head rest, represented by the member 33, backwardly and forwardly a little, the other of which consists in raising and lowering the head rest, as is done by shifting the standard 12 vertically in the guide way 3. When the head rest is raised, the head rest often is carried so far back that it cannot be used in that position. What the operator has to do, in such an instance, is to drop the head rest, and stack a dozen towels or so on it, in order to afford a proper support for the head of the patient or customer. The device forming the subject matter of this application has three main adjustments, namely, the up and down sliding movement of the standard 12, the forward and backward tilting of the head rest 33, and the bodily sliding of the head rest back and forth, from front to back, which is accomplished by moving the member 19 of Fig. 3 accordingly on the part 15. In addition to this, a swinging movement of the part 19, with respect to the member 15, from front to back, can be accomplished if the member 19 is slid forward and back far enough so that the roller 30 is at the ends of the opening 16 of the head 15. So far as I am advised as to the state of the art, this combination of movements, and the described structure which produces that combination is new. There seems to be no occasion for setting forth in detail how the various pins, such as the pin 26 of Fig. 3, are withdrawn and inserted in new holes, that being something which any one can understand without burdening the description accordingly.

The device is capable of use by barbers, surgeons, dentists, beauty parlor workers and others. It takes care of a variety of differences in stature, lengths of the body, lengths of the neck, shapes of the head, and physical deformities, such as hump back, the device being so constructed that almost anyone can take a seat in a chair and have a head support which will be both comfortable to the patient and convenient to the operator.

What is claimed is:

1. In a device of the class described, a head rest support, a head rest carrier, mechanism for mounting the carrier on the support for straight line sliding adjustment from front to back and from back to front, throughout a path of predetermined length, and for mounting the carrier on the support for swinging adjustment from front to back and from back to front, at the ends of said path, a head rest, and means for mounting the head rest on the carrier for swinging adjustment from front to back and from back to front.

2. In a device of the class described, a head rest support, a head rest carrier, mechanism for mounting the carrier on the support for straight line sliding adjustment from front to back and from back to front, said mechanism embodying a loop-shaped head extended backwardly and forwardly on the support and having a longitudinal opening, the carrier having a surface engaged with the upper edge of the head, and a member mounted on the carrier and movable in the opening of the head, said surface being movable around the ends of the head, when said member arrives at either end of the opening and then serves as a pivotal connection between the carrier and the support, a head rest, and means for mounting the head rest on the carrier for swinging adjustment from front to back and from back to front.

3. In a device of the class described, a head rest support, a head rest carrier, mechanism for mounting the carrier on the support for straight line sliding adjustment from front to back and from back to front, throughout a path of predetermined length, and for mounting the carrier on the support for swinging adjustment from front to back and from back to front, at the ends of said path, said mechanism embodying a loop-shaped head extended backwardly and forwardly on the support and having a longitudinal opening, the carrier having a surface engaged with the upper edge of the head, and a member mounted on the carrier and movable in the opening of the head, said surface being movable around the ends of the head, when said member arrives at either end of the opening and then serves as a pivotal connection between the carrier and the support, a head rest, and means for mounting the head rest on the carrier for swinging adjustment from front to back and from back to front.

FRANK H. McCANN.